(12) United States Patent
Nie et al.

(10) Patent No.: US 6,257,281 B1
(45) Date of Patent: *Jul. 10, 2001

(54) MULTI-LAYER TUBING HAVING AT LEAST ONE INTERMEDIATE LAYER FORMED FROM A POLYAMIDE ALLOY

(75) Inventors: Tao Nie, Macomb; Duane Pontbriand, Metamora; David Bensko, Oscoda, all of MI (US)

(73) Assignee: ITT Manufacturing Enterprises, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/023,593

(22) Filed: Feb. 13, 1998

(51) Int. Cl.$^7$ ....................................... F16L 11/04
(52) U.S. Cl. .................... 138/137; 138/141; 138/DIG. 7
(58) Field of Search ................................ 138/137, 141, 138/146, 126, DIG. 7

(56) References Cited

U.S. PATENT DOCUMENTS

| | | |
|---|---|---|
| 3,070,132 | 12/1962 | Sheridan . |
| 3,166,688 | 1/1965 | Rowand et al. . |
| 3,473,087 | 10/1969 | Slade . |
| 3,561,493 | 2/1971 | Maillard et al. . |
| 3,584,656 | * 6/1971 | Van Assendelet et al. .......... 138/137 |
| 3,828,112 | 8/1974 | Johansen et al. . |

(List continued on next page.)

FOREIGN PATENT DOCUMENTS

| | | |
|---|---|---|
| 1779905 | 2/1972 | (DE) . |
| 3821723 | 9/1989 | (DE) . |
| 9001467 | 4/1990 | (DE) . |

(List continued on next page.)

OTHER PUBLICATIONS

Kirk–Othmer, *Encyclopedia of Chemical Technology*, 3d ed., vol. 18, pp. 406–425 (John Wiley & Sons, New York), Jan. 1982.

Shell Chemical Company, *Kraton Thermoplastic Rubber—Processing & Fabricating Kraton Thermoplastic Rubber Compounds*, pp. 1–26 (Apr. 1988).

Shell Chemical Company, *Kraton Thermoplastic Rubber—Typical Properties 1990*, pp. 1–11 (Feb. 1990).

(List continued on next page.)

*Primary Examiner*—James Hook
(74) *Attorney, Agent, or Firm*—Robert P. Seitter (57) ABSTRACT

A multi-layer tube for use in a motor vehicle system to transport fluids containing hydrocarbons such as would be found in a fuel line, a vapor return line or a vapor recovery tube having a first layer radially disposed innermost made up of an extrudable melt-processible thermoplastic material capable of withstanding prolonged exposure to automotive fuel and various fuel additives, and second layer made up of an extrudable, melt-processible non-polyester, non-alcoholic thermoplastic material capable of sufficiently permanent laminar connection with the first layer so as to prevent delamination between the first and second layers during a desired lifetime of the tube. The thermoplastic material of the second layer is made up of at least one constituent which is chemically dissimilar from the thermoplastic material employed in the first layer such as a melt-processible compound having at least two isocyanate groups in combination with a compound which is chemically similar to the thermoplastic material of the first layer such as a thermoplastic elastomer, or a polyamide. The tubing of the present invention may, optionally, include additional layers interposed between the respective layers or may include additional layers which overlie the exterior surface of the second layer.

44 Claims, 2 Drawing Sheets

U.S. PATENT DOCUMENTS

| Number | Date | Name | Ref |
|---|---|---|---|
| 3,907,955 | 9/1975 | Viennot . | |
| 4,243,724 | 1/1981 | Strutzel et al. . | |
| 4,244,914 | 1/1981 | Ranalli et al. . | |
| 4,272,585 | 6/1981 | Strassel . | |
| 4,273,798 | 6/1981 | Scheiber . | |
| 4,303,457 | 12/1981 | Johansen et al. . | |
| 4,330,017 | 5/1982 | Satoh et al. . | |
| 4,448,748 | 5/1984 | Radtke et al. . | |
| 4,614,208 | 9/1986 | Skarelius . | |
| 4,659,625 | 4/1987 | Decroly et al. . | |
| 4,675,780 | 6/1987 | Barnes et al. . | |
| 4,685,090 | 8/1987 | Krevor . | |
| 4,706,713 | 11/1987 | Sadamitsu et al. . | |
| 4,710,337 | 12/1987 | Nordstrom . | |
| 4,762,589 | 8/1988 | Akiyama et al. . | |
| 4,800,109 | 1/1989 | Washizu . | |
| 4,842,024 * | 6/1989 | Palinchak | 138/126 |
| 4,853,297 | 8/1989 | Takahashi et al. . | |
| 4,862,923 * | 9/1989 | Kitami et al. | 138/126 |
| 4,880,036 | 11/1989 | Kitami et al. . | |
| 4,887,647 | 12/1989 | Igarashi et al. . | |
| 4,907,625 | 3/1990 | Ito et al. . | |
| 4,944,972 | 7/1990 | Blembereg . | |
| 4,948,643 | 8/1990 | Mueller . | |
| 4,984,604 | 1/1991 | Nishimura . | |
| 4,990,383 | 2/1991 | Bergstrom et al. . | |
| 5,019,309 | 5/1991 | Brunnhofer . | |
| 5,038,833 | 8/1991 | Brunnhofer . | |
| 5,076,329 | 12/1991 | Brunnhofer . | |
| 5,112,692 | 5/1992 | Strassel et al. . | |
| 5,142,782 | 9/1992 | Martucci . | |
| 5,143,122 | 9/1992 | Adkins . | |
| 5,167,259 | 12/1992 | Brunnhofer . | |
| 5,170,011 | 12/1992 | Martucci . | |
| 5,219,002 | 6/1993 | Stenger et al. . | |
| 5,219,003 | 6/1993 | Kerschbaumer . | |
| 5,258,213 | 11/1993 | Mugge et al. . | |
| 5,284,184 | 2/1994 | Noone et al. . | |
| 5,313,987 | 5/1994 | Rober et al. . | |
| 5,362,529 | 11/1994 | Mugge et al. . | |
| 5,362,570 | 11/1994 | Rober et al. . | |
| 5,373,870 | 12/1994 | Derroire et al. . | |
| 5,380,385 | 1/1995 | Derroire et al. . | |
| 5,383,087 | 1/1995 | Noone et al. . | |
| 5,389,410 | 2/1995 | Mugge et al. . | |
| 5,404,915 | 4/1995 | Mugge et al. . | |
| 5,425,817 | 6/1995 | Mugge et al. . | |
| 5,449,024 | 9/1995 | Rober et al. . | |
| 5,472,784 | 12/1995 | Rober et al. . | |
| 5,474,822 | 12/1995 | Rober et al. . | |
| 5,478,620 | 12/1995 | Mugge et al. . | |
| 5,500,263 | 3/1996 | Rober et al. . | |
| 5,524,673 | 6/1996 | Noone et al. . | |
| 5,554,425 * | 9/1996 | Krause et al. | 138/137 |
| 5,678,611 | 10/1997 | Noone et al. . | |
| 5,743,304 * | 4/1998 | Mitchell et al. | 138/141 |
| 5,827,587 * | 10/1998 | Fukushi | 138/137 |
| 5,884,671 * | 3/1999 | Noone et al. | 138/140 |
| 5,884,672 * | 3/1999 | Noone et al. | 138/140 |

FOREIGN PATENT DOCUMENTS

| | | |
|---|---|---|
| 4001125 | 12/1990 | (DE) . |
| 4001126 | 12/1990 | (DE) . |
| 9007303 | 12/1990 | (DE) . |
| 3942354 | 6/1991 | (DE) . |
| 4006870 | 7/1991 | (DE) . |
| 4025301 | 4/1992 | (DE) . |
| 4137430 | 5/1993 | (DE) . |
| 4214383 | 9/1993 | (DE) . |
| 9400522 | 1/1994 | (DE) . |
| 0164766 | 12/1985 | (EP) . |
| 0436923 | 7/1991 | (EP) . |
| 0551094 | 7/1993 | (EP) . |
| 2114550 | 5/1972 | (FR) . |
| 2577168 | 8/1986 | (FR) . |
| 2577564 | 8/1986 | (FR) . |
| 2204376 | 11/1988 | (GB) . |
| 2211266 | 6/1989 | (GB) . |
| 93/25835 | 12/1993 | (WO) . |
| 95/30105 | 11/1995 | (WO) . |
| 97/44186 | 11/1997 | (WO) . |

OTHER PUBLICATIONS

Advanced Elastomer Systems, *Material Safety Data—Santoprene Thermoplastic Rubber FR Grades*, pp. 1–5 (Dec. 1, 1990).

Central Glass Co., Ltd., *Material Safety Data Sheet—XUA–2U*, pp. 1–2 (Mar. 18, 1991).

Shell Chemical Company, *Material Safety Data Sheet*, pp. 1, 3, 5 (Aug. 10, 1990).

SAE Standard, *Nonmetallic Air Brake System Tubing—SAE J844*, pp. 203–208 (Jun. 1990).

International Plastics Selector, *Plastics Digest—Thermoplastics and Thermosets*, ed. 14, vol. 2, pp. 216–219, 1283–1284 (Jan. 1993).

Donald V. Rosato, David P. Di Mattia, & Dominick V. Rosato, *Designing with Plastics and Composites: A Handbook*, pp. 210–223 (Van Nostrand Reinhold, New York) (Jan. 1991).

Advanced Elastomer Systems, *Santoprene Thermoplastic Rubber—Product Data Sheet—251–80* (Nov. 1991).

Advanced Elastomer Systems, *Santoprene Thermoplastic Rubber—Fluid Resistance*, pp. 1–12 (Jan. 1992).

DSM Thermoplastic Elastomers Inc., *Sarlink 1000 Series—Material Safety Data Sheet*, pp. 1–4 (Jan. 14, 1992).

Novacor Chemicals Inc., *Data Sheet—Sarlink 1570—Fuel Resistant Thermoplastic Elastomer for Marine Hose Applications* (data sheets for other products included) (Nov. 1989)

State of California—Air Resources Board, *Public Hearing to Consider Amendments . . . Regarding Evaporative Emissions Standards . . .* , pp. 1–2, A1–A4, B1–B43 (Aug. 9, 1990).

Vichem Corporation, *Vinyl Compounds—Material Safety Data Sheet—V220–85E–7261* (May 1990).

* cited by examiner

MULTI-LAYER TUBING HAVING AT LEAST ONE INTERMEDIATE LAYER FORMED FROM A POLYAMIDE ALLOY

FIELD OF THE INVENTION

The present invention relates to tubing for use in a motor vehicle. More particularly, the present invention relates to a multi-layer tube which can be employed for transporting hydrocarbon-containing fluids such as automotive fuel. Such tubes would be employed in a fuel line or a vapor recovery line of a motor vehicle.

BACKGROUND OF THE INVENTION

Single layer fuel lines and vapor return lines construed of synthetic materials such as various polyamides have been proposed and employed in the past. Fuel lines employing such materials generally have lengths of at least several meters. In order to fulfill their function, the tubing employed for an automotive fuel line must be inert to the medium flowing through it and resistant to both temperature extremes and to mechanical loads. It is important that the line, once installed, not materially change during the length of operation either by shrinkage or elongation or as a result of the stresses to which the line may be subject during use.

Single layer tubes are not always capable of meeting the necessary requirements. Transport of materials containing aliphatic or aromatic chemicals can create undesirable disadvantages such as permeation, dimensional changes or insufficient mechanical load bearing capacity.

It has become increasingly important that fuel lines be essentially impervious to hydrocarbon emissions due to hydrocarbon permeation through the tube itself. The permissible hydrocarbon emissions due to permeation through fuel lines is severely limited by federal and state regulations. Regulations in states such as California fix the total passive hydrocarbon emission for a vehicle at 2 g/m$^2$ per 24 hour period as calculated by evaporative emission testing methods outlined in Title 13 of the California Code of Regulations, Section 1976 as amended Sep. 26, 1991. To achieve the desired total vehicle emission levels, a hydrocarbon permeation level for fuel lines equal to or below 0.5 g/m$^2$ per 24 hour period is desirable. It is also necessary that the fuel line employed be impervious to interaction with corrosive materials present in the fuel such as oxidative agents and surfactants as well as additives such as methanol and ethanol.

In the past, various types of tubing have been proposed to address these concerns. Co-extruded multi-layer tubing generally employs a relatively thick outer layer composed of a material resistant to the exterior environment. The innermost layer is thinner and is composed of a material which is chosen for its ability to block diffusion of materials, such as aliphatic hydrocarbons, alcohols and other materials present in fuel blends, to the outer layer.

Alcohol and aromatic components in the fuel conveyed through the tube tend to diffuse through the tubing wall at rates different from the aliphatic fuel components. It was feared that the resulting change in the composition of the liquid conveyed through the tubing would change the solubility thresholds of the tubing material to a degree sufficient to be able to crystalize monomers and oligomers of materials such as nylon 12 and nylon 11 into the liquid. It was feared that the crystallized precipitate would block fuel filters, fuel injectors and the like and would collect to limit the travel of the fuel pump or carburetor float as well as build up on critical control surfaces of the fuel pump.

In order to avoid this phenomenon, patents such as U.S. Pat. No. 5,076,329 to Brunhoffer disclosed a five-layer fuel line in which the inner fluid-contacting surface was composed of nylon 6. In U.S. Pat. No. 5,038,833 to Brunhoffer, a three layer fuel line was proposed in which a tube is formed having a co-extruded outer wall of nylon 11 or nylon 12, an intermediate alcohol barrier wall formed of ethylene vinyl alcohol copolymer and an inner water blocking wall formed of a polyamide such as nylon 11 or nylon 12. In DE 40 06 870, a fuel line was proposed in which an intermediate solvent barrier layer is formed of unmodified nylon 6.6 either separately or in combination with polyamide elastomers. The innermost layer is also composed of polyamides such as modified or unmodified nylon 6 while the outer layer is composed of either nylon 6 or nylon 12. UK application number 2 204 376 A discloses a tube which has a thick outer layer composed of a polyamide such as nylon 6 or nylon 6.6 and/or nylon 11 or nylon 12 coextruded with an alcohol-resistant polyolefin, and a copolymer of propylene and maleic acid.

In certain situations, it has been found that multi-layer tube having an innermost layer composed of nylon 11 or nylon 12 can be employed without adverse effects. In U.S. Pat. No. 5,313,987, a multi-layer pipe is disclosed which has an outer polyamide layer and an intermediate layer formed from a mixture of a thermoplastic polyester such as polybutylene terepthalate and a compound having at least two isocyanate groups. The innermost layer may, optionally, be composed of a polyamide.

In all instances, it is necessary to provide proper uniform laminar adhesion between all layers of the multi-layer tubing while achieving appropriate permeation resistant. Thus, advances and innovations regarding bonding materials which can be successfully employed in permeation resistant multi-layer tubing is highly desirable.

In many instances, it is also desirable to provide a tubing which can address the phenomenon of the build up of electrostatic charge on the surfaces of the tubing body. Electrostatic charge is defined as electric charge on the surface of a body such as the fuel tube which occurs when charges are created at a rate faster than they can be dissipated. A charge imbalance results which will continue to increase until a limiting effect such as a spark discharge occurs. In multi-layer fuel tubing, electric charge is built up or derived from the passage of charged particles through the tubing which is made of essentially non-conductive materials.

Discharges generally occur in one of three ways: (a) directly to ground (through air); (b) from one part of a component to another (through air); or (c) to ground through the walls of a component (by dielectric breakdown). If a dielectric breakdown spark discharge occurs, the energy released in the discharge event can melt, degrade or burn the thermoplastic material in the discharge path and produce a pinhole rupture. Once dielectric breakdown occurs, the insulative properties of the material are weakened and subsequent dielectric breakdown events will generally occur at lower electrical field strength. Any subsequent discharge or current flow will tend to occur along the more conductive path thereby enlarging the whole. If this occurs in multi-layer fuel tubing, the risk of tubing rupture is increased with associated increases in the danger of fire and/or explosion of flammable contents in the tubing.

Various patents have been issued which are directed to the problems of lamination strength, permeation resistance, and electrostatic discharge prevention. Among these are U.S.

Pat. No. 5,383,087 to Noone et al which discloses a multi-layer polymeric tube having at least four layers in which an inner layer and an innermost electrostatic discharge layer preferably composed of a fluoroplastic are bonded to an outer layer composed of a thermoplastic material such as thermoplastic elastomers and polyamides. The bonding layer is preferably composed of thermoplastic made up of a polyvinyl fluoride compound and a polyamide.

U.S. Pat. No. 5,524,673 also to Noone et al, discloses various multi-layer tubing constructions having at least three layers in which an outer layer is composed of a thermoplastic material selected from the group consisting of thermoplastic elastomers, polyamides, and mixtures thereof in which one of the layers may optionally be capable of dissipating electrostatic charge. The inner fuel-contacting layer disclosed in this reference is composed of fluoropolymers selected from the group consisting of polyvinylidine fluoride, polyvinyl fluoride, polychlorotrifluoroethylene, ethylene tetrafluoroethylene copolymers, graft copolymers of the preceding fluoroplastic materials together with a fluorine-containing compound such as copolymers of vinylidine fluoride and chlorotrifluoroethane. Alternately, the inner fuel-contacting layer can be composed of a thermoplastic material selected from the group consisting of thermoplastic elastomers, polyamides selected from the group consisting of nylon 12, nylon 11, nylon 6, and mixtures thereof. The materials specified for the intermediate bonding layer include certain fluoroplastic materials such as polyvinylidene fluoride; polyvinyl fluoride; non fluoroplastics such as ethylene vinyl alcohol, polyvinyl acetate-urethane blends, thermoplastic polyesters such as polybutylene terepthalate as well as the various blends discussed in regard to Noone '087.

U.S. Pat. No. 5,460,771 to Mitchell et al discloses a process for making corrugated multi-layer tubing in which the outer layer can be made from any number of thermoplastic materials while the inner fuel contacting layer is made either from a fluoroplastic material or a material which is chemically similar to the outer layer. Bonding layers are composed of the materials previously enumerated in connection with Noone '673. U.S. Pat. No. 5,566,720 to Mitchell et al discloses a multi-layer tube in which the bonding layer is a terpolymer containing a fluorinated alkylene, an α-fluoro olefin and a fluorinated vinyl compound.

The use of compounds having a thermoplastic polyester and a compound containing at least two isocyanate groups as a bonding or intermediate layer in multi-layer tubes has been discussed in U.S. Pat. Nos. 5,313,987; 5,449,024 and 5,474,822 to Rober et al. The use of blends of polyamides and polyesters as a bonding material has been proposed in U.S. Pat. No. 5,362,529 to Mugge et al and U.S. Pat. No. 5,313,987 to Rober et al.

It is desirable to provide a multi-layer tube suitable for use in motor vehicles which is durable and can prevent or reduce permeation of organic materials therethrough. It is also desirable to provide a multi-layer tube in which the various layers are uniformly connected to one another in a manner which will prevent or reduce the potential for delamination between layers during the life of the tubing. Finally, it would be desirable to provide a tubing material which would be capable of preventing build up of electrostatic charge within the tubing and would be capable of safely dissipating any electrostatic charge which may occur.

SUMMARY OF THE INVENTION

The present invention is a multi-layer tube for use in a motor vehicle system to transport fluids containing hydrocarbons such as would be found in a fuel line, a vapor return line or a vapor recovery tube. The elongated multi-layer tube of the present invention includes a first layer radially disposed innermost and having an inner surface capable of prolonged exposure to a fluid containing hydrocarbons. The first layer is composed of an extrudable melt-processible thermoplastic material capable of withstanding prolonged exposure to automotive fuel and various fuel additives. A second layer of the multi-layer tubing is uniformly connected to the first layer. The second layer consists essentially of an extrudable, melt-processible two-part thermoplastic material in which one constituent is a non-polyester, non-alcoholic thermoplastic material capable of sufficiently permanent laminar connection with the first layer so as to prevent delamination between the first and second layers during a desired lifetime of the tube. The thermoplastic material of the second layer has at least one other constituent which is chemically dissimilar from the thermoplastic material employed in the first layer. The multi-layer tube also includes a third layer which is uniformly connected to the second layer and consists essentially of an extrudable melt-processible thermoplastic having as a major constituent a thermoplastic material selected from the group consisting of thermoplastic elastomers, polyamides and mixtures thereof. The tubing of the present invention may, optionally, include additional layers interposed between the respective layers or may include additional layers which overlie the exterior surface of the third layer.

BRIEF DESCRIPTION OF THE DRAWINGS

The objects, features and advantages of the present invention will become more readily apparent from the following description, reference being made to the following drawings in which.

DESCRIPTION OF THE PREFERRED AND ALTERNATIVE EMBODIMENTS

Figure 1:
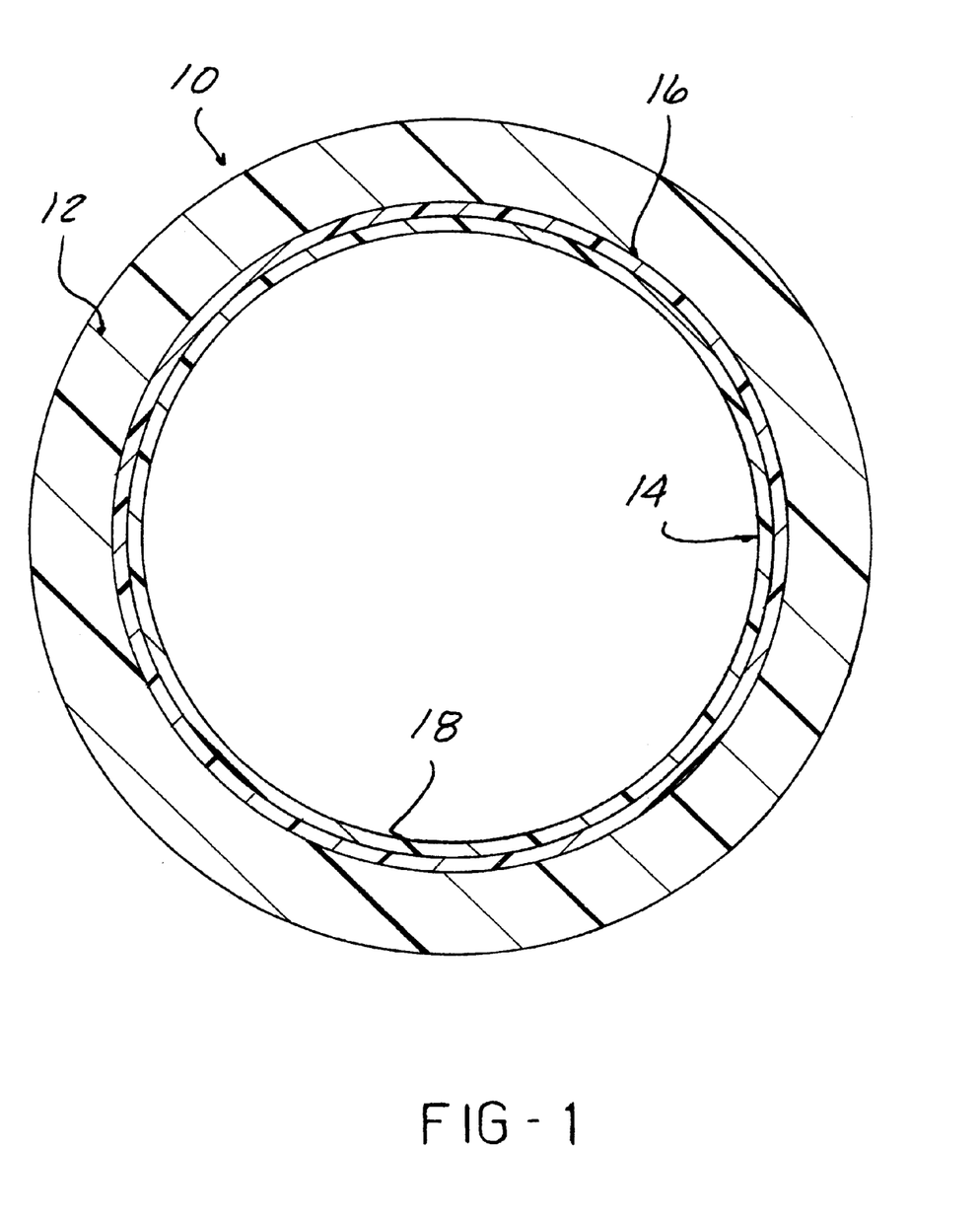
FIG. 1 is a sectional view through a piece of multi-layer tubing having three layers according to the present invention.

The present invention is a multi-layer fuel line and vapor tube 10 which contains at least an inner or first layer 14, at least one intermediate or second layer 16 and at least an outer or third layer 12. The tube 10 of the present invention is, preferably, fabricated by co-extruding the given thermoplastic materials in conventional co-extrusion processes. The tubing 10 may either be co-extruded to a suitable length or may be co-extruded in continuous lengths and cut to fit the given application subsequently. The tubing 10 of the present invention may have an outer diameter up to 50 mm. In applications such as fuel lines and vapor recovery systems, outer diameters up to 63.5 mm (2.5 inches) can be produced.

The multi-layer tube of the present invention may have any suitable wall thickness as desired. In automotive systems such as those described herein, wall thicknesses between 0.5 mm and 2 mm are generally employed; with wall thicknesses of approximately 0.8 mm to approximately 1.5 mm being preferred; and wall thicknesses between about 0.8 mm and about 1.25 mm being most preferred.

Figure 2:
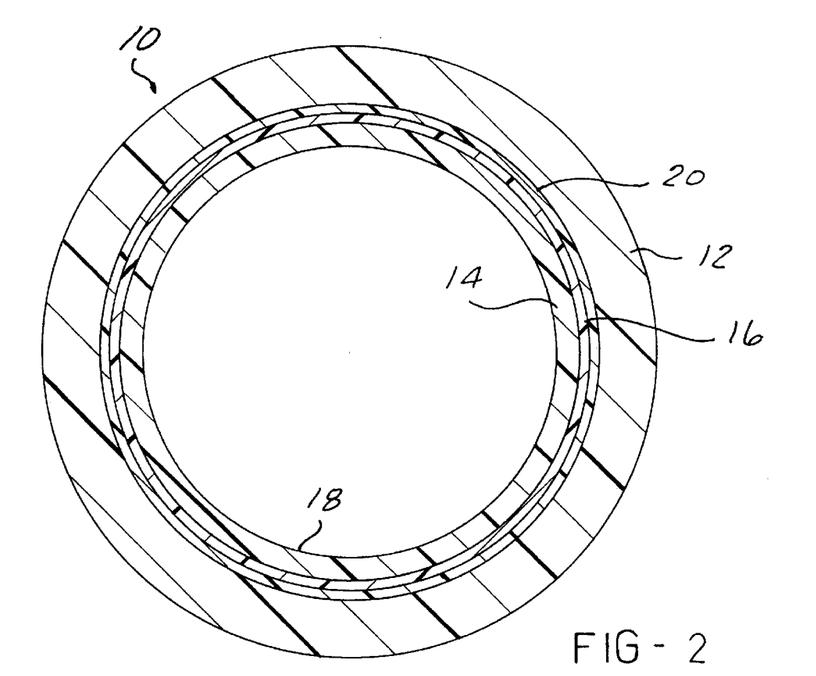
FIG. 2 is a sectional view through a piece of tubing having four layers according to the present invention with an intermediate bonding layer interposed between the second and third layers.
Figure 3:
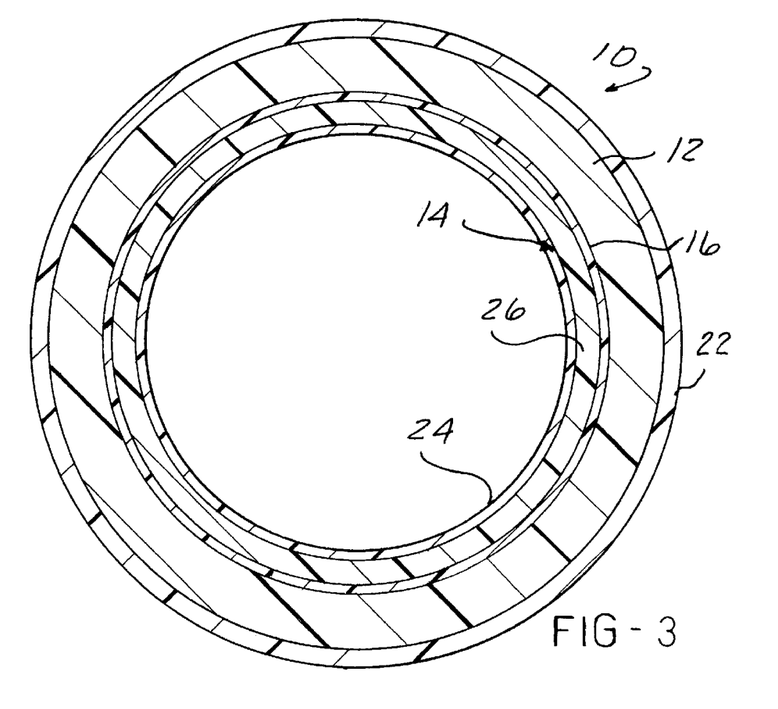
FIG. 3 is a sectional view through a piece of tubing having five layers according to the present invention.

The wall thickness discussed is exclusive of any exterior jacket which may overlie the exterior surface. It is within the scope of this invention to prepare tube material having a plurality of overlying layers of various thermoplastic materials. Preferably, tube 10 of the present invention generally has a maximum of five layers inclusive of bonding layers. However, additional layers can be included as desired and technically permitted. While five layers is considered the general maximum, tubing having three or four layers is also contemplated. Additional layers greater than five are not to be precluded from the purview of this invention if obtainable by co-extrusion methods.

The tube 10 of the present invention is an article which is suitable for use in motor vehicles and comprises a relatively thick outer or third layer 12 which is non-reactive with the external environment and can withstand various shocks, vibrational fatigue and changes in temperature as well as exposure to various corrosive or degradative compounds to which it would be exposed through the normal course of operation of the motor vehicle. Suitable materials for use in outer or third layer 12 of the present invention are generally defined as melt-processible extrudable thermoplastic materials which are sufficiently resistant to ultraviolet degradation, extreme changes in temperature and exposure to gasoline and its additives to permit use in the operational environment. Materials of choice may also exhibit resistance to environmental hazards such as exposure to zinc chloride and resistance to degradation upon contact with materials such as engine oil and brake fluid. It is to be understood that the relative importance of the various enumerated characteristics would depend upon the position of the thermoplastic material of the third layer 12 in the ultimate tube construction.

It is generally anticipated that the outer layer as well as any interior layers uniformly connected thereto, would result in a multi-layer tube suitable for use at an outer service temperature range between about −40° C. and about 150° C., with a range of −20° C. to 120° C. being preferred. The various layers of tube 10 are integrally laminated to one another to provide the resulting multi-layer unit. The various layers are resistant to delamination throughout the lifetime of the multi-layer tube 10. The multi-layer tube 10 of the present invention, preferably, has a tensile strength of no less than 25 N/mm$^2$ and an elongation value at break of at least 150%. The multi-layer tube 10, preferably, has a burst strength at 23° C. and 120° C. of at least 20 bar. The multi-layer tube 10 is resistant to exposure to brake fluid, engine oil and peroxides such as those which may be found in gasoline. Preferably, multi-layer tube 10, in general, and at least the thermoplastic material employed in the outer layer 12, in particular, exhibits appropriate impact resistance at service temperatures at least as low as −20° C. with impact resistance service temperatures as low as −40° C. being preferred. As used herein, the term "impact resistance" is defined as the ability of a thermoplastic to withstand impacts. As employed herein, impact resistance is defined as the ability to withstand of at least 2 foot-pounds at temperatures below about −40° C. according to the Method for Impact Resistance Determination defined in SAE J2260 (Nov. 1, 1997).

The elongated multi-layer tube 10 of the present invention includes an inner or first layer 14 disposed radially innermost. The inner or first layer has an inner surface 18 capable of prolonged exposure to a fluid containing hydrocarbons. Preferably, the first layer 14 consists essentially of a melt-processible thermoplastic which has, as a major constituent, a thermoplastic material selected from the group consisting of polyamides, thermoplastic elastomers, and mixtures thereof.

Suitable polyamides include aliphatic polyamides include nylon 4,6, nylon 6,6, nylon 6,12, nylon 8,10, nylon 10,10, nylon 6, nylon 10,12, nylon 11, nylon 12 and nylon 12,12, and mixtures thereof. The preferred polyamide is a material selected from the group consisting of nylon 6, nylon 6,6, nylon 10,12, nylon 11, nylon 12,12, nylon 12 and mixtures thereof. The identification of polyamide materials above corresponds to international specifications in which the first numeral provides the number of carbon atoms in the starting diamine and the last numeral provides the number of carbon atoms in the dicarboxylic acid. In instances where only one number is quoted, the starting substance was an α ω aminocarboxylic acid or the lactam derived therefrom.

Copolyamides may be used and may be prepared from adipic acid, sebacic acid, suberic acid, isophthalic acid, terephthalic acid as acid or bis(4-aminocyclohexyl)-methane, trimethylhexamethylenediamine, hexamehtylene-diamine or similar codiamine selected from the group consisting of nylon 12, nylon 11, nylon 6, nylon 6.6 and mixtures thereof.

Thermoplastic elastomers which can be employed in the present invention are melt-processible thermoplastics selected from the group consisting of SANTOPRENE, KRAYTON, SARLINK, VICHEM, CARILON and mixtures thereof. SANTOPRENE™ is a thermoplastic rubber commercially available from Advanced Elastomer Systems of St. Louis, Mo.; KRAYTON™ is a thermoplastic rubber comprosed of a styrene-ethylene/butylene-styrene block copolymer commercially available from Shell Chemical Company of Houston, Tex. SARLINK is an oil resistant thermoplastic commercially available from Novacore Chemicals of Leominster, Mass. VICHEM designates a family of polyvinylchloride compounds commercially available from Vichem Corporation of Allendale, Mich. CARILON is an aliphatic polykeytone commercially available from Shell Oil Company of Houston, Tex. Suitable CARILON polymers which can be employed in the present invention is designated as DP 1000.

In the preferred embodiment, the inner layer consists essentially of a polyamide selected from the group consisting of nylon 11, nylon 12, nylon 6, nylon 6.6 and mixtures thereof; with nylon 12 being most preferred. Contrary to previously held belief, it has been found that polyamide materials can be employed successfully in the inner fuel contacting layer in most instances without the adverse effects of solubilization of monomers and aligomers.

The multi-layer tube 10 of the present invention also includes a second layer 16 which is uniformly connected to the first layer 12. The second layer 16 consists essentially of an extrudable melt-processible non-polyester, non-alcoholic thermoplastic material which is capable of sufficiently permanent laminar connection with the first layer so as to prevent delamination from the first layer during the desired lifetime of the tube 10. The thermoplastic material employed in the second layer 16 has at least one constituent which is chemically dissimilar to the thermoplastic material employed in the first layer. The term "chemically dissimilar" as used herein is defined as meaning a polymeric material which is from a different chemical family from the major constituent of the polymeric material of the first layer 14. In instances in which the major constituent of the first layer 14 is a thermoplastic material selected from the group consisting of polyamides, at least one constituent material of the second layer is a non-polyamide thermoplastic. In instances in which the major constituent of the thermoplastic material of the first layer 14 is a thermoplastic elastomer, the second layer includes at least one constituent which is chemically dissimilar from the thermoplastic elastomer employed.

Preferably, the thermoplastic material employed in the second layer 16 is capable of establishing a suitable chemical bond between thermoplastic coextruded layers immediately interior and immediately exterior thereto. Preferably, the thermoplastic material employed in the second layer 16 also exhibits resistance to permeation by components of the fluid to be conveyed through the tube 10; ie components of fuel. The thermoplastic material may or may not include various plasticizers or other modifying agents.

In one embodiment, the second layer 16 consists essentially of a thermoplastic material selected from the group consisting of polyvinylidine fluoride, polyvinyl fluoride, polyvinyl acetate-urethane blends, and mixtures thereof. One preferred fluoroplastic material is a polyvinylidine derived from the thermal dehalogenation of chlorodifluoroethane. One preferred non-fluorocarbon material is a polyvinyl acetate/urethane blend. The materials of choice exhibit an affinity to polymers employed in the inner layer. Suitable thermoplastic materials are commercially available under the tradename "ADEFLON"; from Atochem Inc. elf Aquitaine Group of Philadelphia, Pa.

Alternately, the extrudable melt-processible non-polyester, non-alcoholic thermoplastic material employed in the second layer 16 may contain an isocyanate material as a first chemically dissimilar constituent and a polyamide as a second constituent thereof. Preferably, the polyamide employed in this particular melt-processible thermoplastic material is selected from the group consisting of nylon 6, nylon 6.6, nylon 11, nylon 12 and mixtures thereof; with nylon 12 being most preferred.

The isocyanate constituent employed in the melt-processible non-polyester, non-alcoholic thermoplastic material of the second layer 16 is a compound having at least two isocyanate groups. Suitable compounds include di-functional isocyanates and higher functional isocyanates, preferably aromatic and cycloaliphatic isocyanates such as 1,4 phenylene diisocyanate, 2,4-tolylene diisocyanate, 2,6-tolylene diisocyanate, 1,4-naphthalene diisocyanate, 1,6-hexamethylene diisocyanate, diphenylmethane 2,4-diisocyanate, diphenylmethane 4,4'-diisocyanate, diphenylmethane 2,2'diisocyanate, isophorone diisocyanate, 1,4-tetramethylene diisocyanate, 1,12 dodecane diisocyanate, triphenylmethane 4,4',4" triisocyanate, cyclohexane 1,3 diisocyanate, cyclohexane 1,4-diisocyanate, cyclobutane, 1,3-diisocyanate, 2,4-hexahydrotolylene diisocyanate, 2,6-hexahydrotolylene diisocyanate, hexahydro-1,3-phenylene diisocyanate, hexahydro-1,4-phenylene diisocyanate, norborene diisocyanate, p- or m-xylylene diisocyanate, perhydro-2,4-diphenylmethane diisocyarlate and perhydro-4,4' diphenylmethane diisocyanate. Also suitable are isocyanates having isocyanurate, urethane, acylated urea, biurea, carbodiimide or ester groups as well as oligomeric fatty acid containing isocyanates and perchlorinated arylisocyanates.

The isocyanate modified thermoplastic employed in the second layer 16 will preferably contain between about 60% and about 99% by weight polyamide and between about 1 and about 40% by weight of the compound containing at least two isocyanate groups such that the isocyanate groups originating from this compound provide a total isdcyanate concentration between about 0.03 and about 3% by weight of the thermoplastic material. Preferably, the thermoplastic material contains between about 70 and about 98% by weight polyamide and about 2 to 30% by weight of the compound having at least two isocyanate groups present in an amount between 2.5 and about 10% by weight being most preferred. In the preferred embodiment, the total isocyanate group concentration is between about 0.3 and about 1.8%. Preferably, the compound containing the isocyanate group has at least one isocyanurate, urethane, acylated urea, biuret, carbodiimide or ester group. The materials of choice for the compound having at least two isocyanate groups is a compound selected from the group consisting of isophorone diisocyanate, isocyanurates derived from isophorone diisocyanate, and mixtures thereof.

The third layer 12 is uniformly connected to the second layer and consists essentially of an extrudable melt-processible thermoplastic having as a major constituent a thermoplastic material selected from the group consisting of thermoplastic elastomers, polyamides, and mixtures thereof Suitable thermoplastic elastomers are those which were previously enumerated in connection with the first layer. Suitable polyamides are generally those which were defined in connection with the first layer with the polyamide preferably being selected from the group consisting of nylon 12, nylon 11, zinc chloride resistant nylon 6, nylon 6.6, and mixtures thereof, with nylon 12 being most preferred. It is anticipated that the thermoplastic material employed in the outer layer may be either modified or unmodified to contain various plasticizers, impact modifiers, etc. The thermoplastic material of choice will generally have an elongation at break of 150% and an ability to withstand impacts of at least 2 foot-pounds at temperatures below about −40° C. Various other materials may be added as necessary to increase resistance to ultraviolet degradation, exposure to environmental hazards such as zinc chloride, and degradation upon contact with engine oil and brake fluid. Suitable impact modifying polymers include but are not limited to, ethylene/propylene copolymers or ethylene propylene/diene copolymers.

In instances in which nylon 6 is employed, it is anticipated that the nylon 6 would either exhibit zinc chloride resistance inherently or would contain sufficient quantities of modifying agents to impart a level of zinc chloride resistance greater than or equal to that required by performance requirement 7.5 outlined in SAE standard J2260; i.e. non-reactivity after 200 hour immersion in a 50% by weight zinc chloride solution. The nylon 6 which would be employed in the third layer 12 of the multi-layer tubing 10 of the present invention can also be modified with various plasticizers, flame retardants and the like in manners which would be known to those skilled in the art.

Additionally, the elongated multi-layer tube 10 of the present invention may also include at least one intermediate bonding layer 20 interposed between either the first layer 14 and second layer 16 or the third layer 14 and second layer 16. It is also within the purview of this invention that the multi-layer tube 10 of the present invention include at least one intermediate bonding layer interposed between both the first layer 14 and the second layer 16 and between the second layer 16 and the third layer 14. As depicted in FIG. 2, one intermediate bonding layer 20 is interposed between second layer 16 and third layer 12. The intermediate bonding layer 20 is composed of a suitable melt-processible thermoplastic material capable of suitable laminar adhesion with underlying and overlying layers. Preferably, the intermediate bonding layer 20 or layers 20, 22 consists essentially of a melt-processible thermoplastic selected from the group consisting of polyvinylidine fluoride, polyvinyl fluoride, copolymers of ethylene tetrafluoroethylene, blends of urethane and polyvinyl acetate, and mixtures thereof.

The tube 10 of the present invention may also, optionally, include an outer jacket 22 which surrounds the third or outer layer 12. The jacket 22 may either be coextruded with the other layers during the extrusion process or may be added in a subsequent process such as by cross head extrusion. The outer jacket 22 may be made of any material chosen for its structural or insulating characteristics and may be of any suitable wall thickness. In the preferred embodiment, the outer jacket 22 may be made of a thermoplastic material selected from the group consisting of zinc-chloride resistant nylon 6, nylon 6.6, nylon 11, nylon 12, polypropylene, thermoplastic elastomers and mixtures thereof. Suitable thermoplastic elastomers include SANTOPRENE, KRAYTON, VICHEM, and SARLINK.

When desired, the multi-layer tube 10 of the present invention may be suitably provided so that at least one layer exhibits conductive characteristics rendering the multi-layer tube 10 capable of dissipating electrostatic charge which builds up in the tube during use. When electrostatic dissipative characteristics are desired, it is preferred that one of the inner layers exhibit electrostatic dissipative characteristics. It is most preferred that the radially innermost fuel contacting layer exhibit electrostatic dissipative characteristics.

As used herein, "electrostatic dissipative characteristics" is the ability of the material to dissipate electrostatic charge which builds up in the multi-layer tube. This ability can be thought of as a quantification of the ease that electrical charges can move in a given material. In fuel automotive system components, the electrostatic dissipative characteristics of materials are differentiated on the basis of measured surface resistivity value (expressed as ohms per square). "Surface resistance" of a material is resistivity as measured multiplied by the ratio of specimen surface dimensions (width of electrodes defining the current path divided by the distance between electrodes) which transforms the measured resistance to that obtained if the electrodes formed the opposite sides of a square. The unit of measurement is defined generally as ohms per square (ohm/square).

$$Rs = R \frac{\pi d}{L}$$

where R is measured resistance; d is tube ID; and L is the distance between electrodes.

When electrostatic dissipative characteristics are desired, the tubing 10 of the present invention will include at least one layer in which the polymeric material exhibits an electrostatic dissipation capacity of the polymeric layer is sufficient to leak electrical charge at a level approximately equal to or greater than the rate at which electrostatic charge builds up or accumulates in the tube. Electrostatic charge accumulation is the phenomenon during which charge accumulates in areas of flow transition causing localized charge imbalance. If unchecked, the imbalance continues to grow until the rate of dissipation equals the rate of accumulation or some limiting mechanism such as electrical discharge occurs to cause the level of charges to become balanced or, at the minimum, reduced. Electrostatic dissipation is the action of unbalanced charge being reduced through conduction to ground. The polymeric material employed is, preferably, one which can be defined as having electrical characteristics as moderately conductive or "sufficiently dissipative". As used herein, the term "moderately conductive" is defined as a measurement of surface resistivity levels between about $1 \times 10^4$ ohms per square and about $1 \times 10^6$ ohms per square. As used herein, the term "sufficiently dissipative" as having a measured surface resistivity level of greater than $1 \times 10^6$ ohms per square but less than about $1 \times 10^{10}$ ohms per square.

The polymeric material employed in the layer capable of electrostatic dissipation, referred herein as the "conductive layer" of the present invention may exhibit inherent qualities of electrostatic dissipation or, preferably, may include in its composition a conductive medium in sufficient quantity to permit electrostatic dissipation in the desired range. The conductive medium may be any suitable material of a composition in shape capable of effecting this electrostatic dissipation. The conductive material may be selected from the group consisting of elemental carbon, stainless steel, highly conductive metals such as copper, silver, gold, nickel and silicon, and mixtures thereof. The term "elemental carbon" as used herein is employed to describe and include materials commonly referred to as "carbon black". Carbon black as defined herein is a finely divided form of carbon produced by burning vaporized heavy oil fraction with sufficient air for complete combustion. Carbon black can also be made from methane or natural gas by cracking or direct combustion. The carbon black can be present in the form of carbon fibrous, spheres and the like.

The amount of conductive material contained in the thermoplastic is generally limited by considerations of low temperature durability and resistance to the degradative effects of the gasoline or fuel passing through the multi-layer tube 10. In the preferred embodiment, the thermoplastic material contains conductive material in an amount sufficient to effect electrostatic dissipation. Generally speaking, the maximum amount of conductive material employed in the thermoplastic is less than about 7% by volume with a concentration between about 2% and about 4% by volume being preferred. The conductive material can be either blended into the melt-processible thermoplastic so as to be interstitially integrated into the crystalline structure of the polymer, or it can be incorporated during polymerization of the monomers that make up the thermoplastic material. Without being bound to any theory, it is believed that carbon-containing materials such as carbon black may be incorporated during copolymerization of the surrounding thermoplastic material. Materials such as stainless steel are more likely to be blended into the crystalline structure of the polymer. In the preferred embodiment, the electrostatic dissipation capacity as measured in surface resistance is between $1 \times 10^4$ ohm per square and $1 \times 10^9$ ohms per square as determined by the method for measuring and calculating surface resistance is set forth in SAE J2260.

It is to be understood that electrostatic dissipation capacity can also be expressed in terms of volume resistance; a measurement which recognizes that conduction through the bulk of the material can contribute to reduction of charges that have built up as well as the surface dissipation. Volume resistance is relatable to surface resistance levels but is dependent upon geometry. It is also possible to quantify electrostatic dissipation in terms of rate of charge dissipation. This can be determined by following a procedure such as the one defined by MIL-B-81705 B. As with volume resistance, the actual time for charge to decay that is used to define the three terms is dependent upon geometry. Such correlations can be readily ascertained by the skilled artisan.

It is within the scope of this invention that the first layer 14 may be composed of first and second sublayers 24 and 26, respectively, preferably composed of thermoplastic materials which are chemically similar to one another. Preferably, in such embodiments, the first layer 14 comprises a first sublayer 24 disposed radially innermost having a predetermined first radial thickness and an inner surface capable of prolonged exposure to a fuel containing hydrocarbon. The first layer also includes a second sublayer 26 having a predetermined second radial thickness. The second predetermined radial thickness is at least equal to or greater than the predetermined radial thickness of the first sublayer 22. The second sublayer is uniformly connected to the first sublayer. Preferably at least one sublayer 29 is capable of dissipating electrostatic charge in the manner described previously; with the first sublayer 24 being preferred.

The first and second sublayers are generally composed of the same or similar melt-processable extrudable thermoplastic materials with the significant difference being the electrostatic dissipation capacity.

While preferred embodiments, forms an arrangement of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. An elongated multi-layer fuel and vapor tube comprising:
    a first layer disposed radially innermost having an inner surface capable of prolonged exposure to a fluid containing hydrocarbons, the first layer consisting essentially of a melt-processible thermoplastic, the melt processible thermoplastic selected form the group consisting of polyamides, thermoplastic elastomers, aromatic polyketones and mixtures thereof,
    a second layer uniformly connected to the first layer in co-extruded relationship therewith, the second layer consisting essentially of an extrudable, melt-processible non-polyester, non-alcoholic thermoplastic material capable of sufficiently permanent laminar connection with the first layer so as to prevent delamination from the first layer during a desired lifetime of the tube;
    a third layer uniformly connected to the second layer, the third layer consisting essentially of an extrudable melt-processible thermoplastic having as a major constituent a thermoplastic material selected from the group consisting of thermoplastic elastomers, polyamides and mixtures thereof,
    wherein the thermoplastic material of the second layer contains at least one fluoroplastic constituent which is chemically dissimilar from the thermoplastic material of the third layer in alloyed combination therewith; and
    wherein the elongated multi-layer tube has a hydrocarbon permeation level below about 0.5 g/m$^2$ per 24 hour interval.

2. The elongated multi-layer tube of claim 1 further comprising at least one intermediate bonding layer consisting essentially of a melt-processible thermoplastic selected from the group consisting of polyvinylidine fluoride, polyvinyl fluoride, copolymers of ethylene tetrafluoroethylene, blends of urethane and polyvinyl acetate and mixtures thereof, the intermediate bonding layer interposed between at least two of said layers of said multi-layer tube.

3. The elongated multi-layer tube of claim 2 wherein thermoplastic material employed in the second layer consists essentially of polymeric alloy composed of a melt-processible polyamide and a fluoroplastic material.

4. The elongated multi-layer tube of claim 3 wherein the fluoroplastic material employed in the second layer is selected from the group consisting of polyvinylidine fluoride, polyvinyl fluoride, copolymers of ethylene tetrafluoroethylene, and mixtures thereof.

5. The elongated multi-layer tube of claim 4 wherein the polyamide employed in the second layer is selected from the group consisting of Nylon 12, Nylon 11, Nylon 6, Nylon 10,12, and mixtures thereof.

6. The elongated multi-layer tube of claim 2 wherein the thermoplastic material employed in the first layer is selected from the group consisting of fluoroplastics, thermoplastic elastomers, polyamides and mixtures thereof.

7. The elongated multi-layer tube of claim 6 wherein the thermoplastic material of the first layer is a polyamide selected from the group consisting of nylon 11, nylon 12, nylon 6, nylon 6.6, and mixtures thereof.

8. The elongated multi-layer tube of claim 6 wherein the elastomer thermoplastic material of the first layer is a thermoplastic elastomer selected from the group consisting of Sarlink, Kraton, Vichem, Santoprene, and mixtures thereof.

9. The elongated multi-layer tube of claim 6 wherein the thermoplastic material employed in the first layer is a fluoroplastic selected from the group consisting of copolymers of ethylene tetrafluoroethane, polyvinylfluoride, polyvinylidine fluoride and mixtures thereof.

10. The elongated multi-layer tube of claim 2 wherein at least one layer is capable of dissipating electrostatic charge.

11. The elongated multi-layer tube of claim 10 wherein at least the first layer is capable of dissipating electrostatic, charge.

12. The elongated multi-layer tube of claim 11 wherein electrostatic charge dissipation measured as surface resistivity is less than 1×10$^6$ ohms per square.

13. The elongated multi-layer tube of claim 10 wherein at least one layer contains conductive media in a quantity to dissipate sufficient electrostatic charge to prevent a discharge event.

14. The elongated multi-layer tube of claim 13 wherein at least one layer contains less than about 7% by volume conductive media selected from the group consisting of copper, silver, gold, nickel, silicon, carbon black, and mixtures thereof.

15. An elongated multi-layer tube comprising:
    a first layer disposed radially innermost having an inner surface capable of prolonged exposure to a fluid containing hydrocarbons, the first layer consisting essentially of a melt-processible thermoplastic;
    a second layer uniformly connected to the first layer in co-extruded relationship therewith, the second layer consisting essentially of an extrudable, melt-processible non-polyester, non-alcoholic thermoplastic material capable of sufficiently permanent laminar connection with the first layer so as to prevent delamination from the first layer during a desired lifetime of the tube;
    a third layer uniformly connected to the second layer, the third layer consisting essentially of an extrudable melt-processible thermoplastic having as a major constituent a thermoplastic material selected from the group consisting of thermoplastic elastomers, polyamides and mixtures thereof,
    wherein the thermoplastic material of the second layer contains at least one fluoroplastic constituent which is chemically dissimilar from the thermoplastic material of the third layer in alloyed combination therewith; and
    wherein the thermoplastic material employed in the second layer consists essentially of a first melt-processible thermoplastic compound having at least two isocyanate groups and a second melt-processible thermoplastic compound selected from the group consisting of thermoplastic elastomers, polyamides and mixtures thereof wherein the first and second melt-processible materials are in alloyed relationship with one another.

16. The elongated multi-layer tube of claim 15 wherein the melt-processible thermoplastic material employed in the second layer comprises between about 50 to 99% by weight polyamide and between about 1 to 40% by weight of a compound having at least two isocyanate groups.

17. The elongated multi-layer tube of claim 16 wherein the compound containing at least two isocyanate groups has at least one functional group selected from the group consisting of isocyanate, urethane, acrylated urea, biuret, carbodiimides and esters.

18. The elongated multi-layer tube of claim 16 wherein the compound having at least two isocyanate groups is selected from the group consisting of isophorone diisocyanate, an isocyanurate derived from isophorone diisocyanate, and mixture thereof.

19. The elongated multi-layer tube of claim 16 wherein the polyamide employed in the second layer is selected from the group consisting of Nylon 11, Nylon 12, Nylon 6 and mixtures thereof.

20. The elongated multi-layer tube of claim 15 wherein a t least one layer is capable of dissipating electrostatic charge in a range between about $1\times10^4$ ohm/square and about $1\times10^6$ ohm/square.

21. The elongated multi-layer tube of claim 20 wherein at least the first layer is capable of dissipating electro static charge.

22. The elongated multi-layer tube of claim 21 wherein the first layer comprises:
   a first sublayer disposed radially innermost having a predetermined first radial thickness and an inner surface capable of prolonged exposure to a fluid containing hydrocarbons; and
   a second sublayer having a predetermined second radial thickness, the second predetermined thickness being at least equal to the first predetermined radial thickness, the second sublayer uniformly connected to the first sublayer;
   wherein at least the first sublayer is capable of dissipating electrostatic charge.

23. The elongated multi-layer tube of claim 20 wherein at least one layer contains conductive media in a quantity to dissipate sufficient electrostatic charge to prevent a discharge event.

24. The elongated multi-layer tube of claim 23 wherein at least one layer contains less than about 7% by volume conductive media selected from the group consisting of copper, silver, gold, nickel, silicon, carbon black, and mixtures thereof.

25. An elongated multi-layer tube comprising:
   a first layer disposed radially innermost having an inner surface capable of prolonged exposure to a fluid containing hydrocarbons, the first layer consisting essentially of a melt-processible thermoplastic;
   a second layer uniformly connected to the first layer, the second layer consisting essentially of an extrudable, melt-processible non-polyester, non-alcoholic thermoplastic material capable of sufficiently permanent laminar connection with the first layer so as to prevent delamination from the first layer during a desired lifetime of the tube, wherein the thermoplastic material consists essentially of:
   a) a first melt-processible compound, the first melt-processible compound being non-polyester, non-alcoholic and having at least two isocyanate groups; and
   b) a second melt-processible thermoplastic compound selected from the group consisting of thermoplastic elastomers, polyamides and mixtures thereof, wherein the first and second compound are in alloyed relationship; and
   a third layer uniformly connected to the second layer, the third layer consisting essentially of an extrudable melt-processible thermoplastic having as a major constituent a thermoplastic material selected from the group consisting of thermoplastic elastomers, polyamides and mixtures thereof.

26. The elongated multi-layer tube of claim 25 wherein the melt-processible thermoplastic material employed in the second layer comprises between about 50 to about 99% by weight polyamide and between about 1 to about 40% by weight of a compound having at least two isocyanate groups.

27. The elongated multi-layer tube of claim 26 wherein the compound containing at least two isocyanate groups has at least one functional group selected from the group consisting of isocyanate, urethane, acrylated urea, biuret, carbodiimides and esters.

28. The elongated multi-layer tube of claim 27 wherein at least one layer is capable of dissipating electrostatic charge in a range between about $1\times10^6$ ohm/square to about $1\times10^9$ ohm/square.

29. The elongated multi-layer tube of claim 26 wherein the compound having at least two isocyanate groups is selected from the group consisting of isophorone diisocyanate, an isocyanurate derived from isophorone diisocyanate, and mixture thereof.

30. The elongated multi-layer tube of claim 26 wherein the second constituent of the thermoplastic material of the second layer is polyamide selected from the group consisting of Nylon 11, Nylon 12, Nylon 6 and mixtures thereof.

31. The elongated multi-layer tube of claim 26 further comprising at least one intermediate bonding layer consisting essentially of a melt-processible thermoplastic selected from the group consisting of polyvinylidine fluoride, polyvinyl fluoride, copolymers of ethylene tetrafluoroethylene, blends of urethane and polyvinyl acetate and mixtures thereof, the intermediate bonding layer interposed between at least two of said layers of said multi-layer tube.

32. The elongated multi-layer tube of claim 26 wherein the thermoplastic material employed in the first layer is selected from the group consisting of fluoroplastics, thermoplastic elastomers, polyamides and mixtures thereof.

33. The elongated multi-layer tube of claim 32 wherein the thermoplastic material of the first layer is a polyamide selected from the group consisting of nylon 11, nylon 12, nylon 6, nylon 6.6, and mixtures thereof.

34. The elongated multi-layer tube of claim 32 wherein the elastomer thermoplastic material of the first layer is a thermoplastic elastomer selected from the group consisting of Sarlink, Kraton, Vichem, Santoprene, and mixtures thereof.

35. The elongated multi-layer tube of claim 32 wherein the thermoplastic material employed in the first layer is a fluoroplastic selected from the group consisting of copolymers of ethylene tetrafluoroethane, polyvinylfluoride, polyvinylidine fluoride and mixtures thereof.

36. The elongated multi-layer tube of claim 35 wherein at least the first layer is capable of dissipating electrostatic charge.

37. The elongated multi-layer tube of claim 35 wherein the first layer comprises:
   a first sublayer disposed radially innermost having a predetermined first radial thickness and an inner surface capable of prolonged exposure to a fluid containing hydrocarbons; and a second sublayer having a predetermined second radial thickness, the second predetermined thickness being at least equal to the first predetermined radial thickness, the second sublayer uniformly connected to the first sublayer;

wherein at least the first sublayer is capable of dissipating electrostatic charge in a range between about $1 \times 10^6$ ohm/square and about $1 \times 10^9$ ohm/square.

38. The elongated multi-layer tube of claim 35 wherein at least one layer contains conductive media in a quantity to dissipate sufficient electrostatic charge to prevent a discharge event.

39. The elongated multi-layer tube of claim 38 wherein at least one layer contains less than about 7% by volume conductive media selected from the group consisting of copper, silver, gold, nickel, silicon, carbon black, and mixtures thereof.

40. An elongated multi-layer tube comprising:

a first layer disposed radially innermost having an inner surface capable of prolonged exposure to a fluid containing hydrocarbons, the first layer consisting essentially of a melt-processible thermoplastic; and a second layer uniformly connected to the first layer, the second layer consisting essentially of an extrudable, melt-processible non-polyester, non-alcoholic thermoplastic material capable of sufficiently permanent laminar connection with the first layer so as to prevent delamination from the first layer during a desired lifetime of the tube, wherein the thermoplastic material is a melt-processible thermoplastic alloy consisting essentially of:

a) from about 1 to about 40% by weight of a melt-processible compound having at least two isocyanate groups, and at least one functional group selected from the group consisting of isocyanate, urethane, acrylated urea, biuret, carbodiimides and esters; and b) from about 50 to about 99% of a thermoplastic compound selected from the group consisting of thermoplastic elastomers, polyamides and mixtures thereof.

41. The elongated multi-layer tube of claim 40 wherein the compound having at least two isocyanate groups is selected from the group consisting of isophorone diisocyanate, an isocyanurate derived from isophorone diisocyanate, and mixtures thereof.

42. The elongated multi-layer tube of claim 41 wherein the second constituent of the thermoplastic material of the second layer is polyamide selected from the group consisting of Nylon 11, Nylon 12, Nylon 6 and mixtures thereof.

43. The elongated multi-layer tube of claim 40 further comprising at least one intermediate bonding layer consisting essentially of a melt-processible thermoplastic selected from the group consisting of polyvinylidine fluoride, polyvinyl fluoride, copolymers of ethylene tetrafluoroethylene, blends of urethane and polyvinyl acetate and mixtures thereof, the intermediate bonding layer interposed between said first layer and said second layer.

44. The elongated multi-layer tube of claim 40 wherein the thermoplastic material of the first layer is selected from the group consisting of nylon 11, nylon 12, nylon 6, nylon 6.6, Sarlink, Kraton, Vichem, Santoprene, and mixtures thereof.

* * * * *